Figure 1:
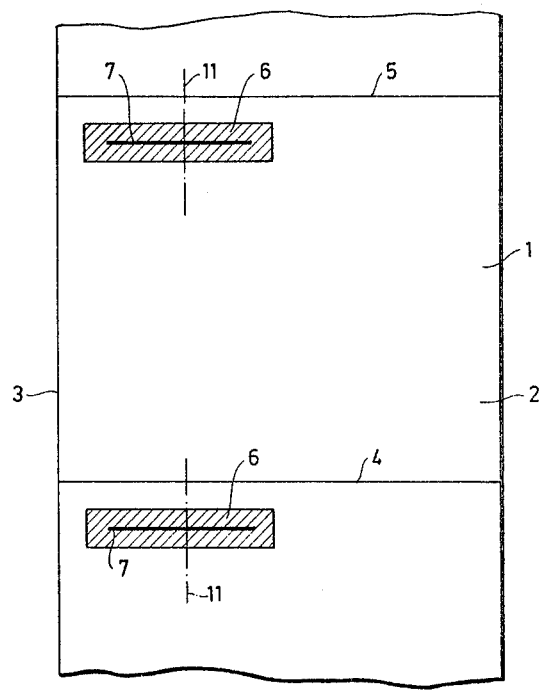

Aug. 16, 1966     K. H. MÅRTENSSON ETAL     3,266,713

PACKAGE WITH A BREAKABLE OPENING-DEFINING MARKING

Filed Nov. 6, 1964

INVENTORS
Kjell Halvard Mårtensson
Karl-Erik Ekström

BY *Pierce, Scheffler & Parker*
ATTORNEYS

United States Patent Office 3,266,713
Patented August 16, 1966

3,266,713
PACKAGE WITH A BREAKABLE OPENING-
DEFINING MARKING
Kjell Halvard Mårtensson, Malmö, and Karl-Erik
Ekström, Lund, Sweden, assignors to Tepar A.G.,
a Swiss company
Filed Nov. 6, 1964, Ser. No. 409,534
Claims priority, application Sweden, Nov. 9, 1963,
12,376/63
1 Claim. (Cl. 229—87)

The present invention relates to a package of the kind which is made from a tube by the transverse sealing of each tube end in a narrow sealing zone, the wall material of the tube comprising an inner layer consisting of a heat sealing plastic, said inner layer being laminated to an outer paper layer under such conditions that the plastic layer during the lamination process has not been heated to a temperature such that it has been oxidized and thereby lost its capability of heat sealing or otherwise been chemically or physically changed, thereby losing its flexibility.

In modern packaging industry packages are often produced in the manner referred to above, i.e. an internally plastic covered paper tube is subdivided by transverse seals to form cushion-like packages which may be detached to form individual package units by means of cuts through said sealing zones. These cushion-like packages may then by deformation be given a permanent, for example parallepipedic, shape. The condition to be satisfied to enable the production in a rational way of a package of the above kind is that the packaging material shall be capable of heat sealing or at least provided with a heat sealing covering, e.g. polyethylene, polypropylene or the like.

The covering of a paper web with plastic, e.g. polyethylene, is generally carried out by applying a plastic film extruded from a slot-shaped nozzle to a pair of pressure rolls for the purpose of uniting the plastic layer and the paper layer with good mutual adherence. This adherence is highly dependent on the temperature of the plastic at the time of covering. Thus, it is obvious that the plastic film, when it is hot and of low viscosity, can better penetrate into the fibres of the paper material and produce good adherence to the paper than if the plastic film is viscous to such extent that the plastic material cannot penetrate into the paper fibres.

Since most of the heat sealing plastics that might be contemplated as covering materials, for example polyethylene, are easily oxidized, if they are heated to such extent that they become of relatively high fluidity, the requirement of adherence between the paper layer and the plastic layer must be adjusted to avoid oxidation of the plastic material, since it would then lose its heat sealing capacity and its flexibility.

In most package designs it is desired that the package shall be easily opened, so that the filling material enclosed in the package will be available. A simple way of providing an opening-defining marking in a package of the kind in question consists in weakening the wall material of the package along part of the wall of the package. A weakening of the wall material must naturally be carried out so that the weakened part of the package wall is easily breakable, without the tightness and strength of the package being therefore jeopardized in normal handling.

Up to now the problem has been solved by breaking right through the package wall along the outline of the desired opening and then reestablishing the opening by applying a strip or the like over the punched region. There have also been provided tear-up markings which have been made so that the packaging material has been weakened, but not broken through, along the outline of the desired opening.

The first mentioned of these solutions has the drawback that the packaging material will be locally thicker along the outline of the desired opening which involves some complication of the mechanical working-up of the package. Furthermore, it has been found that it is difficult to obtain the correct adherence between the strip applied over the punching and the packaging material, since too weak adherence easily gives rise to leakage while too strong adherence renders the package difficult to open and may cause delamination of the wall material.

A solution of the problem which involves partly punching or otherwise weakening the material has been found to be difficult to realize in practice, since the thickness of the packaging material shows relatively large variations and the weakening provided must be adjusted so as not to jeopardize the strength of the package.

A method which is considerably better than those mentioned above consists in completely punching through the packaging material and thereupon covering the punched material as a whole with a heat sealing plastic layer. This plastic covering does not involve any increase in the price of the material, since this must nevertheless be provided with an inner plastic layer for reasons of tightness and with regard to the required heat sealing capacity. With this last mentioned method a material of uniform thickness and with a well-defined weakening is obtained. Unfortunately, it has been found that tear-up markings provided by the method last described present some disadvantages. Thus, the tear-up marking is often difficult to break owing to the elasticity of the plastic layer and owing to the fact that the adherence of the plastic layer to the adjacent layer of the laminate is so weak that the plastic layer comes loose from the adjacent layer in the tearing-up operation.

The present invention, which principally refers to a package having an opening-defining marking of the last-mentioned kind, is concerned with a wall material which comprises an inner layer consisting of a heat sealing plastic, said inner layer being laminated to a paper layer under such conditions that the plastic layer has not been heated during the laminating process to such a temperature that it has been oxidized and thereby lost its heat sealing capacity or has been otherwise chemically or physically changed and thereby lost its flexibiilty, and the invention is characterized by the fact that the package, along the inner border line of one sealing fin has a tear-up marking weakening the layer or layers located outside the said plastic layer and that the plastic layer in a region covering said tear-up marking has had imparted to it both improved adherence to the adjacent paper layer and greater brittleness by being pressed against the adjacent layer with a simultaneous application of heat for the purpose of facilitating the tearing-up of the said tear-up marking.

Figure 2:
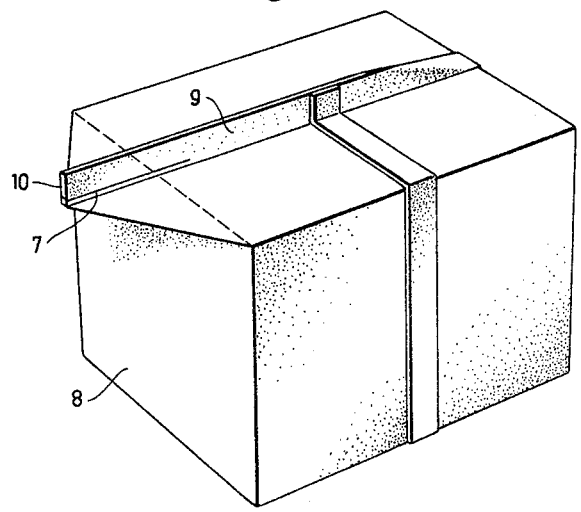

The invention will be described in the following with reference to the accompanying diagrammatic drawing, in which FIG. 1 shows a web of packaging material, and
FIG. 2 shows a package which is provided with a tear-up marking to the kind concerned.

For manufacturing the form of the package according to the invention to be described here one starts from a paper web 1, as shown in FIG. 1. The paper web 1 is first subjected to a punching operation in which the web material is completely broken through along the lines 7 which correspond to the tear-up markings on the finished packages. After performing the punching of the web material the web 1 is covered with a layer of thermoplastic material, for example polyethylene, the cut 7 produced at the punching of the web 1 being covered with a continuous plastic layer.

The covering of the web 1 with plastic takes place by extrusion, i.e. a heated plastic film is extruded through a slot nozzle and is applied to the web 1, while the plastic layer is still hot and semifluid. The plastic covered paper web is then introduced between pressure rolls which press the plastic layer against the paper surface and in this way produce adherence between paper and plastic. As mentioned before, the plastic layer, in this case polyethylene, may be oxidized very easily, if it is heated too much. Such an oxidation of the plastic material should be avoided, since it results in the plastic layer losing its thermoplastic characteristics, i.e. it cannot be heat sealed and it becomes brittle. On the other hand, it is obvious that a plastic layer which is extruded at a higher temperature, i.e. is more fluid at the extrusion, can more easily penetrate into the fibrous paper layer and thus create an improved adherence between paper and plastic.

The requirement as regards good adherence between the paper surface and the plastic layer is greatest in the region around the tear-up marking 7, since the plastic layer easily comes loose from the paper surface when the tear-up marking is broken open. If such a declamination should occur close by the cut 7, it is obvious that the breaking of the tear-up marking is made more difficult, since the plastic has very great elasticity and therefore does not break with certainty along a line corresponding to that punched in the paper.

In order to remove these drawbacks the region of the web 1 surrounding the tear-up marking 7 is treated in such a way that a locally improved adhesion between plastic and paper is obtained at the same time as the plastic layer in this region has imparted to it a brittleness which renders it easy to tear up. Said treatment is carried out by applying a flat press tool provided with a rejecting surface and heated by special means against the plastic layer along the hatched region 6, the plastic layer in this region melting and being pressed into the paper layer, so that an extremely good adherence between paper and plastic is obtained. By heating the plastic layer in the region 6 to such extent that the plastic material is oxidized, the plastic layer in this region will also become more brittle than the surrounding parts of the plastic layer.

The web material produced in the manner described above is thereupon mechanically transformed into a tube by uniting the edges 2 and 3 of the web 1 to form a joint running in the longitudinal direction of the tube. The filling material intended for the package is then introduced into the tube which is subdivided by flat pressing and sealing at narrow zones along the lines 4 and 5 into cushion-shaped packages which then by mechanical deformation and working may have imparted to them a permanent, e.g. parallelepipedic, shape for producing a package for example of the kind shown in FIG. 2.

The package 8 shown in FIG. 2 is provided at its top with a sealing fin 9 which corresponds to the edge line 5 in FIG. 1.

The flat pressing of the tube is made so that one edge 10 of the sealing fin corresponds to the dot and dash line 11 in FIG. 1, which causes the tear-up marking 7 to be folded along the line 11 in such a way that the two parts of the tear-up marking 7 at the opposite sides of the line 11 will be opposite each other and placed immediately under the sealing fin 9 in the finished package.

Since the region 6 treated with heat and pressure does not extend into the corner parts of the package, there is no risk that the plastic material made brittle by the treatment will break at the working-up into shape thereof.

When the package is to be opened the sealing fin 9 which earlier for reasons of space could be folded down against and fixed to the outer side of the package is raised. Owing to the fact that the paper materially is wholly cut through beforehand only the plastic layer which by the oxidation is relatively brittle and very little flexible need to be torn up, which is further facilitated by the adherence between paper and plastic being improved in the opening region of interest.

The embodiment of the invention here illustrated is intended only as an example of a package in which the opening means has proved very advantageous. The package according to the invention may obviously be modified in several ways within the scope of the concept of the invention and may, for example, be formed as a mere cushion-shaped package or a tetrahedron-shaped package of the kind which is now in general use as a packaging for liquids.

We claim:

A package having a body portion and a sealing fin, both formed of a composite wall material consisting essentially of an outer layer of paper and an adhesively attached inner layer of a heat-sealing thermoplastic material, said body portion having a single ply of said wall material and said fin having two plies of said wall material which are adhesively attached to each other through the adjacent layers of thermoplastic material, the paper layers having juxtaposed tear-up markings along the inner border line of said sealing fin, said thermoplastic inner layer in said body portion of said package possessing its original thermoplastic heat sealing characteristics and said thermoplastic inner layer in the region covering said tear-up markings having greater brittleness and stronger adhesion to said paper layer than said inner layer in said body portion thereby facilitating the tearing of both said inner and outer layers at said tear-up markings.

References Cited by the Examiner

UNITED STATES PATENTS

| 3,032,251 | 5/1962 | Jarund | 229—48 |
| 3,074,612 | 1/1963 | Schneider | 229—17 |
| 3,145,907 | 8/1964 | Schwinger | 229—53 |
| 3,167,232 | 1/1965 | Partridge | 229—17 |

FOREIGN PATENTS 1,274,530  9/1961  France.

JOSEPH R. LECLAIR, *Primary Examiner.*

D. M. BOCKENEK *Assistant Examiner.*